United States Patent
Von Hoyningen-Huene et al.

(10) Patent No.: US 11,588,894 B2
(45) Date of Patent: Feb. 21, 2023

(54) METHOD AND DEVICE FOR OPERATING A COMMUNICATION SYSTEM

(71) Applicant: Robert Bosch GmbH, Stuttgart (DE)

(72) Inventors: Johannes Von Hoyningen-Huene, Sindelfingen (DE); Stephan Schultze, Lohr-Wombach (DE)

(73) Assignee: Robert Bosch GmbH, Stuttgart (DE)

( * ) Notice: Subject to any disclaimer, the term of this patent is extended or adjusted under 35 U.S.C. 154(b) by 11 days.

(21) Appl. No.: 16/805,123

(22) Filed: Feb. 28, 2020

(65) Prior Publication Data

US 2020/0296165 A1   Sep. 17, 2020

(30) Foreign Application Priority Data

Mar. 12, 2019 (DE) .................... 102019203352.0

(51) Int. Cl.
| | | |
|---|---|---|
| *H04L 41/04* | (2022.01) | |
| *H04L 67/12* | (2022.01) | |
| *H04L 67/147* | (2022.01) | |
| *H04L 41/12* | (2022.01) | |
| *H04L 67/142* | (2022.01) | |
| *H04L 67/141* | (2022.01) | |

(52) U.S. Cl.
CPC .............. *H04L 67/12* (2013.01); *H04L 41/12* (2013.01); *H04L 67/141* (2013.01); *H04L 67/142* (2013.01); *H04L 67/147* (2013.01)

(58) Field of Classification Search
CPC ....... A61B 5/0004; G06F 21/86; G06F 11/27; G06F 11/2236; H04L 12/6418; H04L 43/50; H04L 12/40136; H04L 41/12; H04L 41/22; H04L 43/10; H04L 43/18; H04L 43/026; H04L 12/1881; H04L 27/2601; H04L 61/4535; H04B 1/74; H04B 3/493; H04B 7/2656; H01H 35/2607; G11C 29/56012; H04W 74/04; H04W 28/06; H04N 21/41407
See application file for complete search history.

(56) References Cited

U.S. PATENT DOCUMENTS

| | | | | |
|---|---|---|---|---|
| 6,055,656 A | * | 4/2000 | Wilson, Jr. | G06F 11/2236 714/724 |
| 6,532,215 B1 | * | 3/2003 | Muntz | H04B 3/493 370/242 |
| 2002/0062462 A1 | * | 5/2002 | Ohwada | G06F 11/27 714/E11.169 |
| 2003/0231607 A1 | * | 12/2003 | Scanlon | H04W 74/04 370/349 |
| 2004/0153870 A1 | * | 8/2004 | Konz | H04B 1/74 714/47.2 |

(Continued)

*Primary Examiner* — Dustin Nguyen
(74) *Attorney, Agent, or Firm* — Norton Rose Fulbright US LLP; Gerard Messina

(57) ABSTRACT

A method for operating a communication system, in which multiple communication units exchange data via a communication medium, the method including the following steps: shifting the communication system at least temporarily into a diagnostic operating mode, in which data exchanged by multiple, in particular, by all of the communication units via the communication medium are available on at least one of the multiple communication units and/or on at least one component of the communication medium.

13 Claims, 5 Drawing Sheets

(56) References Cited

U.S. PATENT DOCUMENTS

| | | | | |
|---|---|---|---|---|
| 2006/0083172 A1* | 4/2006 | Jordan | H04L 43/50 | 370/241 |
| 2007/0053385 A1* | 3/2007 | Tollbom | H04L 43/026 | 370/537 |
| 2007/0121638 A1* | 5/2007 | Szczebak | H04L 61/4535 | 370/473 |
| 2008/0049654 A1* | 2/2008 | Otal | H04W 28/06 | 370/473 |
| 2008/0146213 A1* | 6/2008 | Kim | H04L 12/1881 | 455/422.1 |
| 2008/0247416 A1* | 10/2008 | Gentieu | H04L 43/18 | 370/465 |
| 2009/0013356 A1* | 1/2009 | Doerr | H04N 21/41407 | 725/62 |
| 2009/0238293 A1* | 9/2009 | Bhatti | H04L 27/2601 | 370/345 |
| 2009/0309745 A1* | 12/2009 | Johnson | G06F 21/86 | 340/635 |
| 2010/0023867 A1* | 1/2010 | Coldiron | H04L 41/22 | 715/736 |
| 2010/0124209 A1* | 5/2010 | In | H04B 7/2656 | 370/337 |
| 2011/0211441 A1* | 9/2011 | Matityahu | H04L 43/10 | 370/217 |
| 2013/0059578 A1* | 3/2013 | Finberg | H04L 12/6418 | 455/425 |
| 2015/0236940 A1* | 8/2015 | Zinner | H04L 12/40136 | 709/224 |
| 2017/0115343 A1* | 4/2017 | Chen | G11C 29/56012 | |
| 2017/0180233 A1* | 6/2017 | Nistor | H04L 41/12 | |
| 2018/0137938 A1* | 5/2018 | Vaddiraju | A61B 5/0004 | |
| 2019/0013166 A1* | 1/2019 | Dotsch | H01H 35/2607 | |

\* cited by examiner

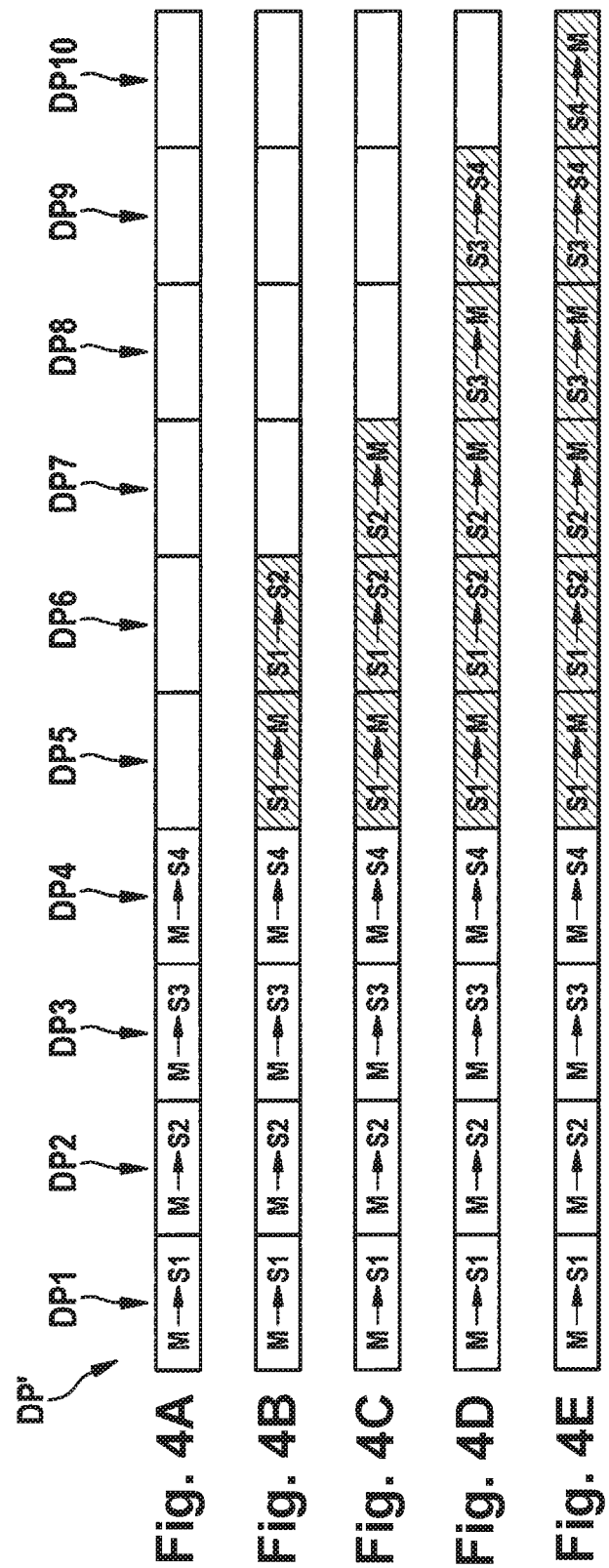

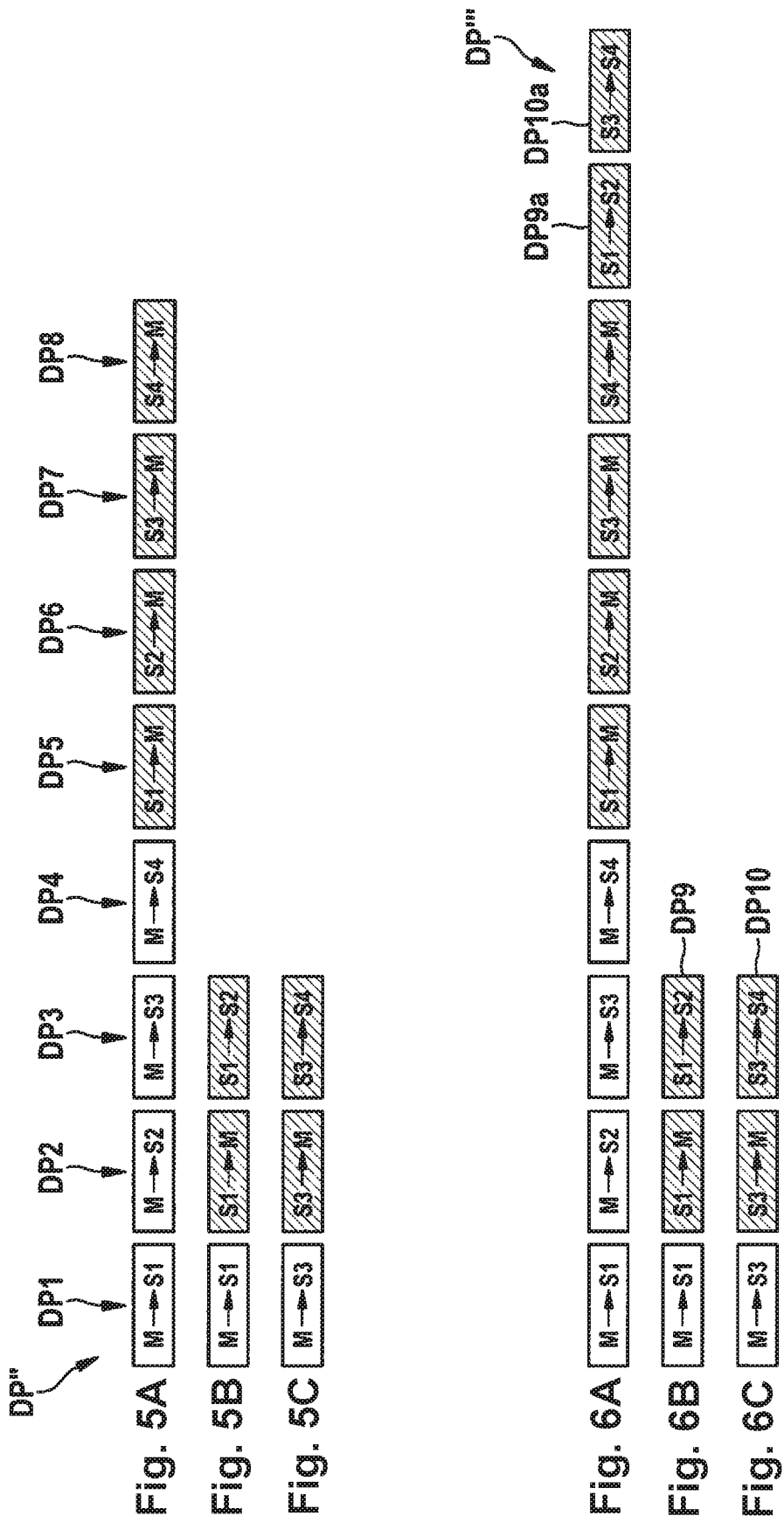

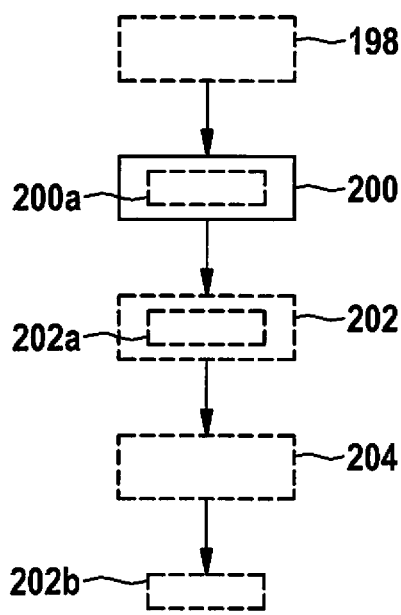
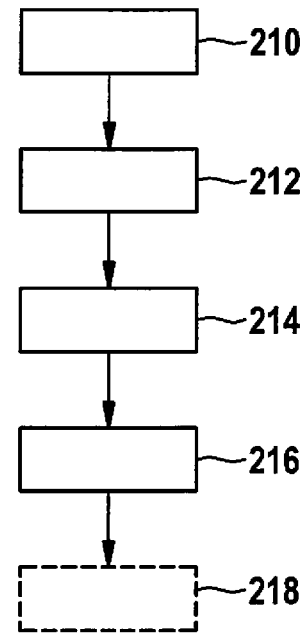
Fig. 7A    Fig. 7B
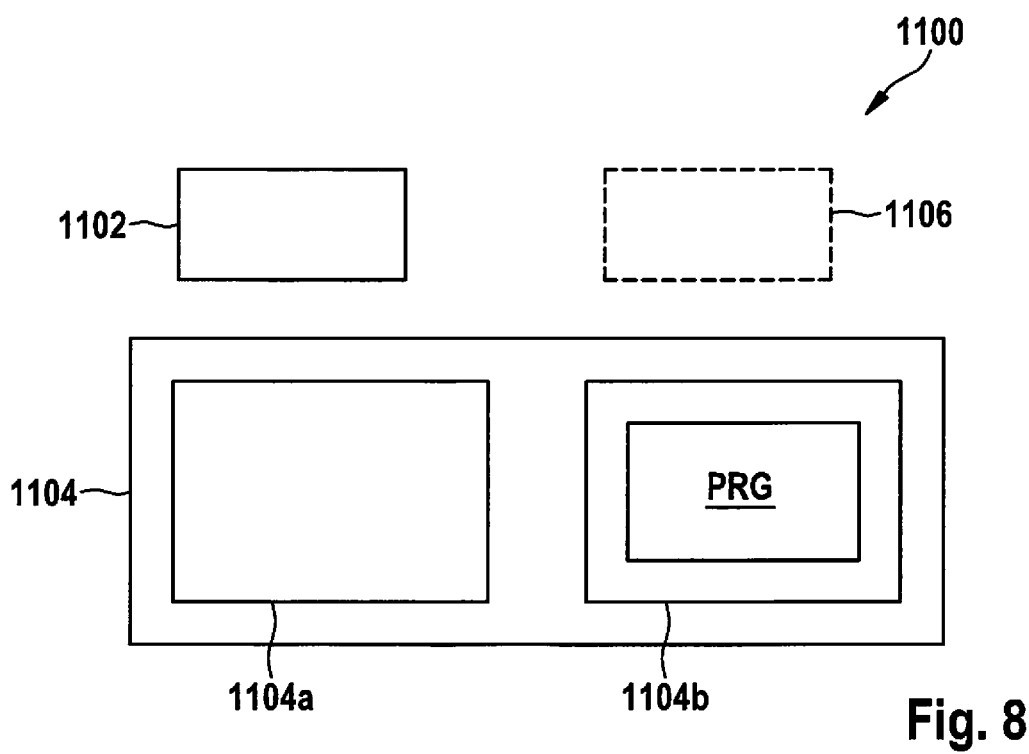
Fig. 8

METHOD AND DEVICE FOR OPERATING A COMMUNICATION SYSTEM

RELATED APPLICATION INFORMATION

The present application claims priority to and the benefit of German patent application no. DE 10 2019 203 352.0, which was filed in Germany on Mar. 12, 2019, the disclosure of which is incorporated herein by reference.

FIELD OF THE INVENTION

The present invention relates to a method for operating a communication system. The present invention further relates to a device for operating a communication system.

SUMMARY OF THE INVENTION

Specific embodiments relate to a method for operating a communication system, in which multiple communication units exchange data via a communication medium, the method including the following steps: shifting the communication system at least temporarily into a diagnostic operating mode, in which data exchanged by multiple, in particular, by all of the communication units via the communication medium are available on at least one of the multiple communication units and/or on at least one component of the communication medium. In this way, an efficient diagnosis may be carried out, because the exchanged data of the multiple, in particular, of all communication units may be concentrated, for example, on one (single) particular communication unit or data connection or the like.

In other words, it may thus be achieved in specific embodiments that all exchanged data are available at one physical tapping point, for example, for collection and/or for evaluation.

In further specific embodiments, the communication system may, for example be an Ethernet-based communication system or industrial communication system or network, in particular, of an "industrial Ethernet" type. The communication system (and/or at least one component of the communication system) in further specific embodiments may, for example, be configured to operate at least temporarily and/or at least in part according to the Industrial Ethernet Protocol "Sercos III" and/or according to the Industrial Ethernet Protocol "EtherCat" and/or to operate as a so-called Time Sensitive Networking, TSN communication system. A Time Sensitive Networking, TSN—communication system according to further specific embodiments is a communication system that is based on the Ethernet Standard (for example, according to IEEE 802.1Q 2018) and includes at least one component, in particular, a switch ("TSN switch"), which is configured to operate according to the IEEE Standard 802.1Qbv.

In further specific embodiments, the communication system includes an apparatus/device (arrangement) for electrical and/or optical data transmission, for example, (copper-) cables and/or fiber-optic light guides, which according to further specific embodiments may also be configured in different topologies, for example, in a ring topology and/or in a star topology and or in a mixed form thereof.

In further specific embodiments, it is provided that the communication system is operated at least temporarily in a first operating mode that differs from the diagnostic operating mode, in which, in particular, data exchanged by not all of the multiple communication units via the communication medium are available on at least one of the multiple communication units and/or on at least one component of the communication medium.

The first operating mode corresponds to a regular operation, which according to further specific embodiments may be carried out if no diagnosis or a limited diagnosis is required.

In further specific embodiments, it is provided that in the diagnostic operating mode at least a portion, which may be all of the data exchanged via the communication medium are collected and/or evaluated.

In further specific embodiments, it is provided that the collection and/or evaluation take/takes place a) during the diagnostic operating mode and/or b) at least in part after the diagnostic operating mode.

In further specific embodiments, it is provided that after the diagnostic operating mode, the communication system is shifted into the first operating mode and/or into another operating mode different from the diagnostic operating mode.

In further specific embodiments, it is provided that the method further includes: configuring at least one component of the communication system, in particular, at least one of the multiple communication units and/or at least one component of the communication medium, for the diagnostic operating mode.

In further specific embodiments, the configuring of at least one component of the communication system, in particular, of at least one of the multiple communication units and/or of at least one component of the communication medium for the diagnostic operating mode may include at least one of the following steps: planning communication properties for one or for multiple, in particular, for all communication users (for example, communication units) and/or infrastructure components (for example, network coupling elements, which are able to connect multiple network segments and/or terminals such as, for example, the communication units or the like to one another, for example, switches and/or bridges). The planning according to further specific embodiments includes, in particular, (but if necessary, not exclusively) packet structures and data structures and/or network paths (for example, pieces of information about which data connections are to be used), on which data, in particular, data packets, are exchanged in the communication system.

In further specific embodiments, the configuration or the planning takes place in such a way that in the diagnostic operating mode, there is at least one point ("diagnostic point") in the communication or in the network, at which all included data (for example, data of multiple or of all communication units) are monitorable. In further specific embodiments, it is, however, also conceivable for the purpose of redundancy that substantively identical data packets or copies of data packets also take additional other network paths, which lead past this diagnostic point, for example.

In further specific embodiments, a configuration of at least one component of the communication system, in particular, of at least one of the multiple configuration units and/or of at least one component of the communication medium, or a planning of communication properties for one or for multiple, in particular, for all communication users, for at least one operating mode different from the diagnostic operating mode takes place in an at least essentially analogous manner, with respect to the configuration or the planning for the diagnostic operating mode. In this case, multiple, in particular, all data streams of the communication system may be planned or considered according to further specific embodiments, if necessary, advantageously no restrictions occurring at least in some configurations, as they could occur while implementing the diagnostic point according to further specific embodiments. The principle criteria for the configuration or the planning of the at least one other operating mode according to further specific embodiments are a minimization of latency periods and/or of a bandwidth requirement and/or the increase in or guarantee of reliability.

In further specific embodiments, the configuration or the planning for both the diagnostic operating mode as well as for the at least one other operating mode may take place in such a way that, for example, from an application perspective, they result in the same system behavior of the communication system, in particular, among other things, a cycle time and/or the quantity and/or the type of data to be produced and to be consumed, being at least approximately the same, which may be exactly the same in each communication user. In further specific embodiments, the configuration or the planning for both the diagnostic operating mode as well as for the at least one other operating mode may also take place in such a way that a synchrony between the communication users in the various operating modes does not deviate and/or the latencies during data transmissions are not significantly impaired.

In further specific embodiments, it is provided that at least one of the multiple communication units for the diagnostic operating mode a) activates a port mirror function ("port mirroring") and/or b) filters data.

In further specific embodiments, it is provided that, for example, a port of a network coupling element, for example, of a switch, is configured at least temporarily, in particular, for the diagnostic operating mode, in such a way that all data (packets) or telegrams directed through this port are output, if necessary, including additional timestamp information. This means that in further specific embodiments, at least one "mirrored" data packet may be provided with a timestamp in connection with the port mirroring. In further specific embodiments, it is provided that data packets from multiple ports of the switch are output via a mirroring port (port for outputting "mirrored" or copied data packets), for example, the data of multiple lines of communication connected to this switch being able to be diagnosed. In further specific embodiments, it is provided that the mirroring port has a higher transmission rate (for example, 1 Gbit (Gigabit)/s (second)), than the other ports (for example, 100 Mbit (Megabit)/s).

One variant according to further specific embodiments is, in particular, also a cascadability of mirror ports: if the mirror ports of multiple network coupling elements, for example, switches—in addition to "normal cabling"—are connected to another network coupling element, for example, to another switch, which is configured to again or to further combine and to output at a shared port the data mirrored or combined by individual switches ("diagnostic information"), the result is a function of a "diagnostic data concentrator." This variant is also arbitrarily further cascadable with other network coupling elements, for example, switches, in other hierarchical levels.

In further specific embodiments, it is provided that one or multiple communication user(s) combine parts of the pieces of information of the (or their) entire network traffic at least temporarily, in particular, during the diagnostic operating mode, which may be achieved, for example, by the previously mentioned filtering. In this way, it is, in particular, possible in further specific embodiments to optimally utilize the communication bandwidth, at the same time a predefinable piece of diagnostic information being available at the tapping point. In addition to the data normally transmitted, for example, the telegram traffic of two other users could also be fed into an Ethernet line of the communication system in order to receive their cross traffic at the tapping point.

Further specific embodiments relate to a device for operating a communication system, in which multiple communication units exchange data via a communication medium, the device being configured to carry out the following steps: shifting the communication system at least temporarily into a diagnostic operating mode, in which data exchanged by multiple, in particular, by all of the communication units via the communication medium are available on at least one of the multiple communication units and/or on at least one component of the communication medium.

In further specific embodiments, it is provided that the device is configured for carrying out the method according to the specific embodiments.

In further specific embodiments, the device according to the specific embodiments, or the functionality of the device according to the specific embodiments, is integrated into at least one communication unit (for example, into a terminal and/or a switch) of the communication system.

Further specific embodiments relate to a use of the method according to the specific embodiments and/or of the device according to the specific embodiments a) for diagnosing at least one component of the communication system and/or b) in a motor vehicle and/or in an industrial production facility.

Additional features, potential applications and advantages of the present invention result from the following description of exemplary embodiments of the present invention, which are depicted in the figures of the drawing. All described or depicted features in this case form the subject matter of the invention alone or in arbitrary combination, regardless of their combination as described herein or their back-reference, and regardless of their wording or representation in the description or in the drawings.

BRIEF DESCRIPTION OF THE DRAWINGS

FIGS. 4A, 4B, 4C, 4D, and 4E each show data packets according to further specific embodiments.

FIGS. 5A, 5B, and 5C each show data packets according to further specific embodiments.

FIGS. 6A, 6B, and 6C each show data packets according to further specific embodiments.

FIG. 7A schematically shows a simplified flow chart of a method according to further specific embodiments.

FIG. 7B schematically shows a simplified flow chart of a method according to further specific embodiments.

FIG. 8 schematically shows a simplified block diagram of a device according to further specific embodiments.

DETAILED DESCRIPTION

Figure 1:
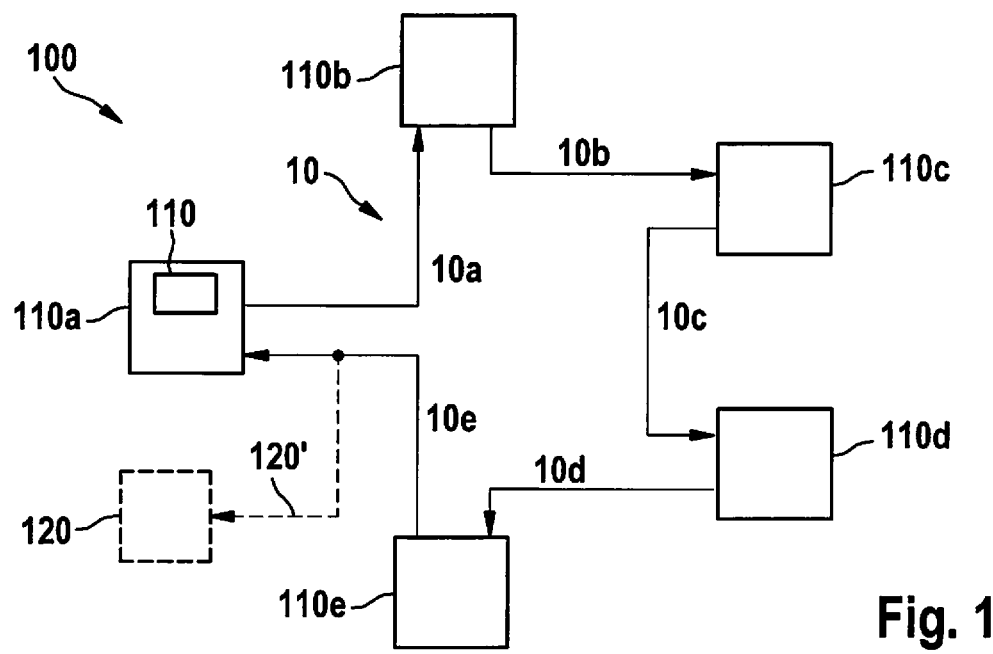
FIG. 1 schematically shows a block diagram of a communication system according to specific embodiments.

FIG. 1 schematically shows a block diagram of a communication system 100 according to specific embodiments. Communication system 100 includes multiple communication units 110a, 110b, 110c, 110d, 110e, which exchange data via a communication medium 10, for example, in the form of data packets. Communication medium 10 in the present case has a ring-shaped topology by way of example, including a first data connection 10a between first communication unit 110a and second communication unit 110b, including a second data connection 10b between second communication unit 110b and third communication unit 110c, including a third data connection 10c between third communication unit 110c and fourth communication unit 110d, including a fourth data connection 10d between fourth communication unit 110d and fifth communication unit 110e, a fifth data connection 10e being provided between fifth communication unit 110e and first communication unit 110a.

In further specific embodiments, communication system 100 may, for example, be an Ethernet-based communication system or industrial communication system or network, in particular of the "industrial Ethernet" type. For example, communication system 100 (and/or at least one component of the communication system) in further specific embodiments may be configured to operate at least temporarily and/or at least in part according to the Industrial Ethernet Protocol "Sercos III" and/or according to the Industrial Ethernet Protocol "EtherCAT" and/or to operate as a so-called Time Sensitive Networking, TSN, communication system. A Time Sensitive Networking, TSN—communication system according to further specific embodiments is a communication system, which is based on the Ethernet Standard and which includes at least one component, in particular, a switch ("TSN switch"), which is configured to operate according to the IEEE Standard 802.1Qbv.

Figure 2:
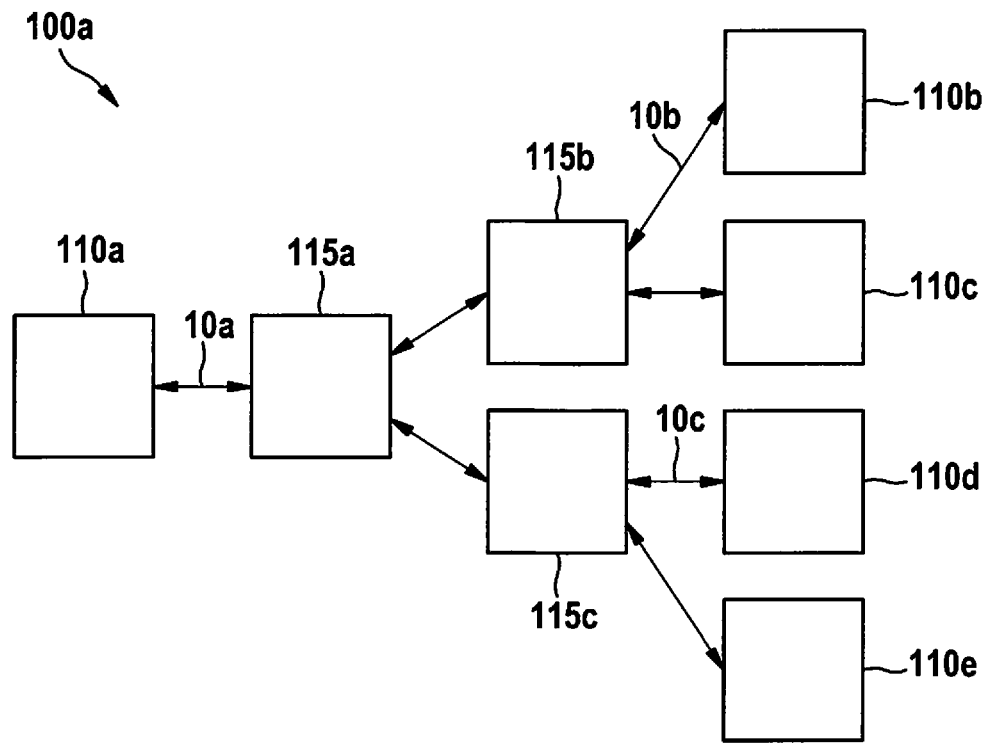
FIG. 2 schematically shows a block diagram of a communication system according to further specific embodiments.

In further specific embodiments, communication medium 10 includes apparatus/device (arrangement), in particular, data connections, 10a, . . . , 10e for electrical and/or optical data transmission, for example, copper cables and/or fiber-optic light guides, which according to further specific embodiments may also be configured in different topologies, for example, in the ring topology previously described above with reference to FIG. 1 and/or in a star topology or star-like topology as described by way of example further below with reference to FIG. 2. For example, the participating communication units 110a, 110b, . . . , 110e in the ring topology depicted in FIG. 1 may each have two Ethernet ports (not depicted) in order to establish a connection with each of the two data connections (for example, 10a, 10b in the case of communication unit 110b).

Further specific embodiments relate to a method for operating communication system 100 (FIG. 1), the method including the following steps, cf. also the flow chart according to FIG. 7a: shifting 200 communication system 100 (FIG. 1) at least temporarily into a diagnostic operating mode 202, in which data exchanged by multiple, in particular, by all of communication units 110a, 110b, 110c, 110d, 110e (FIG. 1) via communication medium 10, are available on at least one of the multiple communication units 110a, 110b, 110c, 110d, 110e and/or on at least one component 10e of communication medium 10. In this way, it is possible to carry out an efficient diagnosis, because the exchanged data of the multiple, in particular, of all communication units 110a, 110b, 110c, 110d, 110e, may be concentrated, for example, on a (single) particular communication unit (in the present case, on communication unit 110e, for example). This is indicated by way of example by dashed arrow 120', which indicates that the data as aggregated or concentrated above are feedable to an optional device 120 for collection and/or evaluation.

In other words, it may thus be achieved in specific embodiments that all exchanged data are available at one physical tapping point 10e, for example, for collection and/or for evaluation by optional device 120.

Further specific embodiments relate to a device 110 for operating communication system 100, which is configured to carry out the method according to the specific embodiments. Device 110 or a functionality suitable to it may be integrated in further specific embodiments into first communication unit 110a, which according to further specific embodiments may be configured, for example, also as a "master" communication unit (or master station) 110a, whereas other communication units 110b, 110c, 110d, 110e according to further specific embodiments may also be configured as "slave" communication units ("slave stations").

In further specific embodiments, device 110 or a functionality suitable to it may also be situated externally of "master" communication unit 110a, for example, also in optional device 120 (and/or in a slave communication unit, etc.).

In further specific embodiments, it is provided that communication system 100 (FIG. 1) is operated at least temporarily in a first operating mode 198 different from diagnostic operating mode 200 (FIG. 7A), in which, in particular, data exchanged by not all of multiple communication units 110a, . . . , 110e via communication medium 10 are available at on least one of the multiple communication units and/or at least one component of the communication medium. First operating mode 198 corresponds to a regular operation, which according to further specific embodiments may be carried out if no diagnosis or a limited diagnosis is required. For example, first operating mode 198 may be initially carried out according to the flow chart of FIG. 7A before transitioning with the aid of step 200 into diagnostic operating mode 202 according to specific embodiments.

In further specific embodiments, it is provided that in diagnostic operating mode 202 at least a portion, which may be all, of the data exchanged via communication medium 10 are collected and/or evaluated, for example, with the aid of device 120.

In further specific embodiments, it is provided that the collection and/or evaluation may be carried out a) during diagnostic operating mode 202, cf. step 202a from FIG. 7A, and/or b) take place at least in part after diagnostic operating mode 202, cf. step 202b from FIG. 7A.

In further specific embodiments, it is provided that after diagnostic operating mode (202) (FIG. 7A), communication system 100 (FIG. 1) is shifted into first operating mode 198 and/or into another operating mode different from the diagnostic operating mode, cf. optional step 204.

In further specific embodiments, it is provided that the method further includes: configuring 200a at least one component of the communication system, in particular, at least one of multiple communication units 110a, . . . , 110e (and/or 115a, 115b, 115c in the case of FIG. 2, see below) and/or at least one component 10a, . . . , 10e of communication medium 10, for the diagnostic operating mode.

In further specific embodiments, configuration 200a of at least one component of the communication system, in particular, of at least one of the multiple communication units and/or of at least one component of the communication medium, for the diagnostic operating mode includes at least one of the following steps: planning of communication properties for one or for multiple, in particular, for all communication users (for example, the communication units) and/or infrastructure components (for example, network coupling elements 115a, 115b, 115c, see FIG. 2, which are able to connect multiple network segments and/or terminals such as, for example, the communication units or the like, to one another, for example, switches and/or bridges). The planning according to further specific embodiments includes, in particular, (but, if necessary, not exclusively) packet structures or data structures and/or network paths, on which data, in particular, data packets may be exchanged in communication system 100 (FIG. 1).

In further specific embodiments, configuration 200a (FIG. 7A) or the planning takes place in such a way that in diagnostic operating mode 202 there is at least one point ("diagnostic point") in communication system 100 or in the network, at which all planned data (for example, data of multiple or of all communication units) are monitorable. In further specific embodiments, it is, however, also conceivable for the purpose of redundancy that substantively identical data packets or copies of data packets also take additional other network paths, which lead past this diagnostic point, for example.

In further specific embodiments, a configuration of at least one component of communication system 100, in particular, of at least one of multiple communication units 110a, . . . 110e and/or of at least one component of communication medium 10, or a planning of communication properties for one or for multiple, in particular, for all communication users, for at least one operating mode other than the diagnostic operating mode, takes place in an essentially analogous manner, with respect to the configuration or the planning for the diagnostic operating mode. In this case, multiple, in particular, all data streams of communication system 100 may be planned or considered according to further specific embodiments, if necessary, advantageously no restrictions occurring at least in some configurations, as they could occur while implementing the diagnostic point according to further specific embodiments. The principle criteria for the configuration or the planning of the at least one other operating mode according to further specific embodiments are a minimization of latency periods and/or of a bandwidth requirement and/or the increase or assurance of reliability.

In further specific embodiments, the configuration or the planning for both the diagnostic operating mode as well as for the at least one other operating mode may take place in such a way that, for example, from an application perspective, they result in the same system behavior of the communication system, in particular, a cycle time and/or the quantity and/or the type of data to be produced and to be consumed, among other things, being at least approximately the same, which may be exactly the same in each communication user. In further specific embodiments, the configuration or the planning for the diagnostic operating mode as well as for the at least one other operating mode may also take place in such a way that a synchrony among the communication users in the various operating modes does not deviate and/or the latencies during data transmissions are not significantly impaired.

Figure 3A:
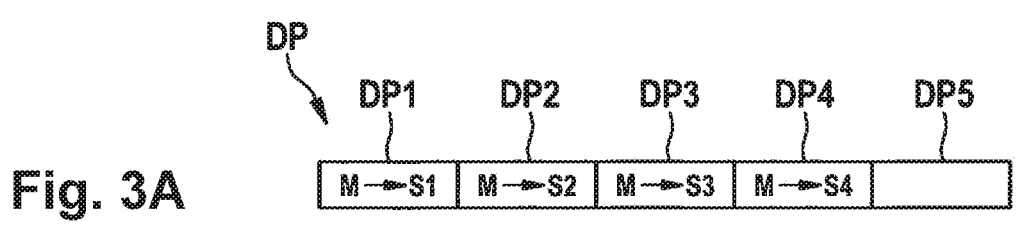
FIGS. 3A, 3B, 3C, 3D, and 3E each show data packets according to further specific embodiments.

FIGS. 3A through 3E each show data packets DP according to further specific embodiments, as they are usable for a data exchange on ring-shaped medium 10 of communication system 100. Data packet DP corresponds to an example of the structure of a sum packet for the cited ring topology on various network sections (a-e), for example, during normal operation 198 (FIG. 7A). Thus, FIG. 3A shows the content of data packet DP in the area of data connection 10b, etc. From FIG. 3A, it is apparent, for example, that master communication unit 110a transmits data to all slave communication units 110b, 110c, 110d, 110e, and compares individual sub-data packets DP1, DP1, DP3, DP4. First sub-data packet DP1, for example, contains data ("M→S1"), which master communication unit 110a transmits to first slave communication unit 110b, second sub-data packet DP2 contains data ("M→S2"), which master communication unit 110a transmits to second slave communication unit 110c, etc., and fifth sub-data packet DP5 is unused in this case, i.e., is empty.

Figure 3B:

FIG. 3B shows the content of the (same) data packet DP from FIG. 3A in the area of data connection 10b. From this, it is apparent that first slave communication unit 110b transmits data ("S1→S2") to second slave communication unit 110c (for this purpose, previously, cf. FIG. 3A, unused sub-data packet DP5 is used in this case) and to master communication unit 110a ("S1→M"). The data contents of sub-data packets DP1, DP5 have therefore undergone a change when passing through first slave communication unit 110b, which is indicated by the hatching. The other sub-data packets DP2, DP3, DP4 are not changed when passing through first slave communication unit 110b.

Figure 3C:
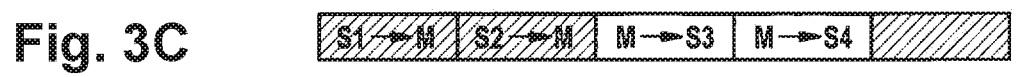

FIG. 3C shows the content of the (same) data packet DP from FIGS. 3A, 3B in the area of data connection 10c (FIG. 1). From this, it is apparent in addition to FIG. 3B, that second slave communication unit 110c transmits data to master communication unit 110a ("S2→M").

Figure 3D:
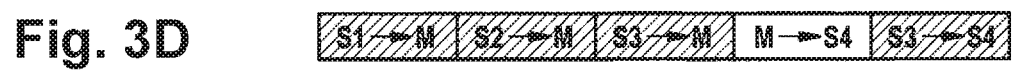

FIG. 3D shows the content of the (same) data packet DP from FIGS. 3A, 3B, 3C in the area of data connection 10d (FIG. 1). From this, it is apparent in addition to FIG. 3C that third slave communication unit 110d transmits data to master communication unit 110a ("S3→M", cf. sub-data packet DP3) and to fourth slave communication unit 110e ("S3→S4", cf. data packet DP5).

Figure 3E:

FIG. 3E shows the content of the (same) data packet DP from FIGS. 3A, 3B, 3C, 3D in the area of data connection 10e (FIG. 1). From this, it is apparent in addition to FIG. 3D, that fourth slave communication unit 110e transmits data to master communication unit 110a ("S4→M", cf. sub-data packet DP4).

From FIG. 3A, it is apparent that in further specific embodiments slave communication units 110b, . . . , 110e overwrite fields or sub-data packets during normal operation 198 (FIG. 7A), which in terms of ring topology 10 (FIG. 1) are not required by subsequent slave communication units, cf. the hatched fields. Sum packet DP has a minimum length. At no location 10a, . . . , 10e in network 100 are all data or the data of all communication units 110a through 110e of communication system 100 available.

In contrast, in further specific embodiments, the structure of sum (data) packets DP' shown by way of example in FIGS. 4A through 4E may occur in diagnostic operating mode 202 (FIG. 7A), as indicated by a corresponding configuration, cf. step 202a.

Similar to FIGS. 3A through 3E, FIG. 4A shows the content of data packet DP' (now for diagnostic operating mode 202) in the area of data connection 10a, FIG. 4B shows the content of data packet DP' in the area of data connection 10b, etc. From FIG. 4A through 4E, it is apparent that master communication unit 110a transmits data to all slave communication units 110b, 110c, 110d, 110e, cf. sub-data packets DP1, DP2, DP3, DP4 of data packet DP'. In contrast to the configuration according to FIGS. 3A through 3E, slave communication units 110b, 110c, 110d, 110e overwrite in each case only empty fields of other sub-data packets DP5, . . . , DP10 in the configuration according to FIGS. 4A through 4E (see hatching). As a result, sum packet DP' is noticeably longer than corresponding sum packet DP according to FIG. 3. For this purpose, the data of all communication units 110a, 110b, . . . , 110E are tappable at one (single) location 10e in the area of data connection 10e (FIG. 1, FIG. 4E), for example, by device 120, which may represent a diagnostic device in further specific embodiments.

The different behavior of components 110a, 110b, . . . , 110e and the respective configuration of data packets DP, DP' as previously described above may be established with the aid of planning and/or configuration, cf. step 202a from FIG. 7A, so that an efficient concentration of data of interest (FIG. 4E) at location 10e is achievable at least during diagnostic operating mode 202, whereas during normal operation, for example, resources are saved, because data packets DP are shorter.

FIG. 2 schematically shows a block diagram of a communication system 100a according to further specific embodiments. In contrast to FIG. 1, communication system 100a according to FIG. 2 has no ring topology, but an essentially hierarchical topology ("tree topology") including a master communication unit (or master station) 110a and four "slave" communication units (or slave stations) 110b, 110c, 110d, 110e, which are interconnected by bridges 115a, 115b, 115c. Individual data connections 10a, 10b, 10c are also identified by way of example in FIG. 2. Further in contrast to FIG. 1, each communication unit 110a, 110b, 110c, 110d each requires only one (for example, Ethernet) connection for establishing a data connection.

FIGS. 5A through 5C show data packets DP1, . . . , DP8, in each case identified together with reference sign DP''' according to further specific embodiments, as they are usable for a data exchange on the tree-like medium of communication system 100a according to FIG. 2. Data packets DP1 through DP8 correspond to the data packets of communication system 100a, which appear at network section 10a, i.e., at data connection 10a between master communication unit 110a and first bridge 115a, for example, during normal operation 198 (FIG. 7A). FIG. 5B shows data packets not further identified, which appear at data connection 10b (FIG. 2), and FIG. 5C shows data packets also not further identified, which appear at data connection 10c (FIG. 2). Comparable to FIG. 3 (for communication system 100 according to FIG. 1), neither all data nor the data of all communication units 110a through 110e of communication system 100 are available at any location 10a, . . . , 10e in network 100a in FIG. 5 (for communication system 100a according to FIG. 2).

In contrast, in further specific embodiments, the structure of sum (data) packets DP''' shown by way of example in FIGS. 6A through 6E may occur in diagnostic operating mode 202 (FIG. 7A), as indicated, for example, by a corresponding configuration, cf. step 202a. In the present case, for example, data packets DP9, FIG. 6B and DP10, FIG. 6C for the cross traffic ("S1→S2" and "S3→S4") are also forwarded from bridges 115b, 115c (FIG. 2) in the direction of master communication unit 110a, so that all exchanged pieces of information are tappable on data connection 10a, for example, for a diagnostic device 120 (FIG. 1).

The different behavior of components 110a, 110b, . . . , 110e, 115a, 115b, 115c of communication system 100a according to FIG. 2 and the respective configuration of these components and of data packets DP'', DP''' as previously described above may be advantageously established with the aid of planning and/or configuration, cf. step 202a from FIG. 7A, so that an efficient concentration of data of interest (FIG. 6A) at location 10a is achievable at least during diagnostic operating mode 202, whereas during normal operation, for example, resources are saved, because fewer data packets DP''' appear.

The principle according to the specific embodiments may also be similarly applied to topologies and/or configurations of communication systems 100, 110a different from the topologies described by way of example above with reference to FIGS. 1, 2.

In further specific embodiments, it is provided that for diagnostic operating mode 202, at least one of multiple communication units 110a, . . . , 110e, a) activates a port mirroring function ("port mirroring) and/or b) filters data.

In further specific embodiments, it is provided that, for example, a port of a network coupling element, for example, of a switch, is configured at least temporarily, in particular, for the diagnostic operating mode, in such a way that all data (packets) or telegrams directed through this port are output, if necessary including additional timestamp information. This means that in further specific embodiments, at least one "mirrored" data packet may be provided with a timestamp in connection with the port mirroring. In further specific embodiments, it is provided that data packets from multiple ports of the switch are output via a mirroring port (port for outputting "mirrored" or copied data packets), for example, the data of multiple lines of communication connected to this switch being able to be diagnosed. In further specific embodiments, it is provided that the mirroring port has a higher transmission rate (for example, 1 Gbit (Gigabit)/s (second)), than the other ports (for example, 100 Mbit (Megabit)/s).

One variant according to further specific embodiments is, in particular, also a cascadability of mirror ports: if the mirror ports of multiple network coupling elements, for example, switches—in addition to "normal cabling" are connected to another network coupling element, for example, to another switch, which is configured to again or to further combine and to output at a shared port the data mirrored or combined by individual switches ("diagnostic information"), the result is a function of a "diagnostic data concentrator." This variant is also arbitrarily further cascadable with other network coupling elements, for example, switches, in other hierarchical levels.

In further specific embodiments, it is provided that one or multiple communication users combine parts of the pieces of information of the (or their) entire network traffic at least temporarily, in particular, during the diagnostic operating mode, which may be achieved, for example, by the previously mentioned filtering. In this way, it is, in particular, possible in further specific embodiments to optimally utilize the communication bandwidth, at the same time a predefinable piece of diagnostic information being present at the tapping point. In addition to the data normally transmitted, for example, the telegram traffic of two other users could also be fed in an Ethernet line of the communication system in order to obtain their cross traffic at the tapping point.

FIG. 7B schematically shows a simplified flow chart of a method according to further specific embodiments. In step 210, master communication unit 110a (FIG. 1) checks (for example, while being controlled by device 110), whether the communication is to be configured in diagnostic module 202 (FIG. 7A) or in another operating mode, for example, in a mode optimized with respect to resource requirements having, if necessary, reduced diagnostic potential. In further specific embodiments, the information about the selection of the mode may be loaded via an engineering tool into a memory of controller 110 or also predefined via a control element (not shown) such as a switch on a housing (also not shown).

Based on a selected application (operating mode: for example, normal operation 198 or diagnostic operation 202), controller 110 plans in step 212 (FIG. 7B) the required communication properties for all communication users 110*a*, 110*b*, . . . , 110*e*, 10, 10*a*, 10*b*, . . . , and infrastructure components. Controller 110 then distributes the communication parameters in step 214 and thus configures the communication behavior of users 110*a*, . . . , 10*e* and, if necessary, bridges 115*a*, 115, 115*b*, in the case of a configuration according to FIG. 2, in the network.

Other communication-dependent parameters in users 110*a*, 10*e* are optionally also configured by controller 110, which may also take place in step 214.

In step 216, controller 110 checks whether the configuration according to step 214 proceeded successfully, for example, whether the configuration was confirmed by all slave communication units 110*b*, 110*c*, 110*d*, 110*e*. If yes, controller 110 switches into a real time operation, in which the previously configured configuration parameters are applied and all users 110*a*, 110*b*, . . . , 110*e* (and, if necessary infrastructure components 115*a*, 115*b*, 115*c* in the case of a configuration according to FIG. 2) fulfill their applicative task.

If diagnostic operating mode 202 (FIG. 7A) has been selected in configuration 214, then there is (at least) one point 10*e* in network 100 (FIG. 1) according to step 214 from FIG. 7B, at which the complete data traffic may be monitored, cf. optional step 218 from FIG. 7B. For this purpose, it is sufficient in further specific embodiments, if necessary, to also read the data traffic on an Ethernet link 10*e*. Access to the internal memory of master 110*a* or of slaves 110*b*, . . . , 110*e* is not required in further specific embodiments.

In further specific embodiments, an optional evaluation of the data ascertained during diagnostic operating mode 202 may take place in two ways.

In an "online diagnosis," the optional evaluation of the data takes place at virtually the same time as the data transmission, cf. step 202*a* from FIG. 7A, i.e., particular events are already recognized during operation.

In an offline diagnosis, cf. also step 202*b* from FIG. 7A, a series (predefinable number) of communication cycles are recorded and the corresponding data are stored. Evaluation 202*b* of these stored data subsequently takes place and may, if necessary, also last longer than the actual recording time. As a result, a significantly more complex evaluation of the diagnostic data in general may take place.

If the diagnosis of the system is completed, it is possible to exit diagnostic operating mode 202 (FIG. 7A) in further specific embodiments and to skip, for example, normal operating mode 198 (if necessary, with another configuration).

In further specific embodiments, controller 110 (FIG. 1) may be prompted via an engineering tool or a local control element of controller 110 or of master 110*a* to exit the diagnostic operating mode again. Controller 110 may subsequently be notified that the next start no longer takes place in diagnostic operating mode 202.

In further specific embodiments, it is possible if needed to also dynamically switch (during the operating time of system 100, 100*a*) from normal operating mode 198 (or from another operating mode) into diagnostic operating mode 202 and vice versa.

Further specific embodiments relate to a use of the method according to the specific embodiments and/or to device 110 according to the specific embodiments a) for diagnosing at least one component of communication system 100, 100*a* and/or b) in a motor vehicle and/or in an industrial production facility.

FIG. 8 schematically shows a simplified block diagram of a device 1100 according to further specific embodiments. Device 110 from FIG. 1 may, for example, include configuration 1100 according to FIG. 8. Device 1100 includes at least one computing device 1102, at least one memory device 1104 assigned to computing device 1102 for storing at least temporarily a computer program PRG, computer program PRG being configured, in particular, for controlling an operation of device 110, 1100 and/or for carrying out the method according to the specific embodiments.

In further specific embodiments, computing device 1102 includes at least one of the following elements: a microprocessor, a microcontroller, a digital signal processor (DSP), a programmable logic module (for example, FPGA, field programmable gate array), an ASIC (application-specific integrated circuit), a hardware circuit. Combinations of these are also conceivable in further specific embodiments.

In further specific embodiments, memory device 1104 includes at least one of the following elements: a volatile memory 1104*a*, in particular, a working memory (RAM), a non-volatile memory 1104*b*, in particular, a flash EEPROM. Computer program PRG may be stored in non-volatile memory 1104*b*. Device 1100 optionally includes a data interface 1106 for transmitting data, in particular, data packets via medium 10 (FIG. 1), for example, at least one Ethernet port 1106. In further specific embodiments, one or multiple configurations 202*a* (FIG. 7A) may, for example, be transmitted via this data interface 1106 to additional communication units 110*a*, 110*b*, 110*e*, 115*a*, 115*b*, 115*c*, etc.

The principle according to the specific embodiments also allows a simple diagnosis of the system behavior to be carried out in systems 100, 100*a*, which are optimized in a very efficient and simultaneously deterministic communication since, for example, only one tapping point 10*e* (FIG. 1) for the data traffic is necessary for this purpose. As a result of this simplification of the diagnosis, not only the development, but also the troubleshooting is accelerated, which both ultimately save costs.

The principle according to the specific embodiments may be particularly used in communication systems 100, 100*a*, in which data traffic on the one hand is highly optimized in order, for example, to implement applications that place high demands on reliability and latency, and on the other hand, in which it is desirable, for example, for diagnostic purposes to obtain a complete picture of the system and of the data traffic. Such particular applications lie, for example, in industrial communication, but also in the time-critical networking within vehicles, in particular, motor vehicles.

What is claimed is:

1. A method for operating a communication system, the method comprising:
 exchanging, among at least three communication units, data via a communication medium; and
 shifting the communication system at least temporarily into a diagnostic operating mode, in which data exchanged by multiple or by all of the communication units via the communication medium are available on at least one of the multiple communication units and/or on at least one component of the communication medium, wherein:

all of the exchanged data from the at least three communication units is available at a single physical tapping point in the diagnostic operating mode,
all of the exchanged data from the at least three communication units is included in a data packet accessible at the tapping point,
the data packet includes a plurality of sub-data packets,
a first set of the sub-data packets respectively contains data from a first of the at least three communication units to each remaining one of the at least three communication units,
a second set of the sub-data packets respectively contains data from each remaining one of the at least three communication units to the first of the at least three communication units, and
a third set of the sub-data packets respectively contains data from at least one remaining one of the at least three communication units to at least one other remaining one of the at least three communication units.

2. The method of claim 1, wherein the communication system is operated at least temporarily in a first operating mode differing from the diagnostic operating mode, in which, in particular, data exchanged by not all of the multiple communication units via the communication medium are available on at least one of the multiple communication units and/or on at least one component of the communication medium.

3. The method of claim 1, wherein at least a portion or all of the data exchanged via the communication medium are collected and/or evaluated in the diagnostic operating mode.

4. The method of claim 3, wherein the collection and/or evaluation occurs: a) during the diagnostic operating mode; and/or b) at least in part after the diagnostic operating mode.

5. The method of claim 2, wherein after the diagnostic operating mode, the communication system is shifted into the first operating mode and/or into another operating mode different from the diagnostic operating mode.

6. The method of claim 1, further comprising:
configuring at least one component of the communication system, in particular, at least one of the multiple communication units and/or at least one component of the communication medium for the diagnostic operating mode.

7. The method of claim 1, wherein at least one of the multiple communication units: a) activates a port mirroring function and/or b) filters data for the diagnostic operating mode.

8. An apparatus for operating a communication system, comprising:
a device configured to perform the following:
exchanging, among three communication units, data via a communication medium; and
shifting the communication system at least temporarily into a diagnostic operating mode, in which data exchanged by multiple or by all of the communication units via the communication medium are available on at least one of the multiple communication units and/or on at least one component of the communication medium, wherein:
all of the exchanged data from the at least three communication units is available at a single physical tapping point in the diagnostic operating mode,
all of the exchanged data from the at least three communication units is included in a data packet accessible at the tapping point,
the data packet includes a plurality of sub-data packets,
a first set of the sub-data packets respectively contains data from a first of the at least three communication units to each remaining one of the at least three communication units,
a second set of the sub-data packets respectively contains data from each remaining one of the at least three communication units to the first of the at least three communication units, and
a third set of the sub-data packets respectively contains data from at least one remaining one of the at least three communication units to at least one other remaining one of the at least three communication units.

9. The apparatus of claim 8, wherein the communication system is operated at least temporarily in a first operating mode differing from the diagnostic operating mode, in which, in particular, data exchanged by not all of the multiple communication units via the communication medium are available on at least one of the multiple communication units and/or on at least one component of the communication medium.

10. The apparatus of claim 8, wherein at least one component of the communication system is diagnosed in a motor vehicle.

11. The apparatus of claim 8, wherein at least one component of the communication system is diagnosed in an industrial production facility.

12. The method of claim 1, wherein at least one component of the communication system is diagnosed in a motor vehicle.

13. The method of claim 1, wherein at least one component of the communication system is diagnosed in an industrial production facility.

* * * * *